United States Patent
Chambliss et al.

(10) Patent No.: US 9,104,332 B2
(45) Date of Patent: Aug. 11, 2015

(54) MANAGING METADATA AND DATA FOR A LOGICAL VOLUME IN A DISTRIBUTED AND DECLUSTERED SYSTEM

(71) Applicant: INTERNATIONAL BUSINESS MACHINES CORPORATION, Armonk, NY (US)

(72) Inventors: David D. Chambliss, Morgan Hill, CA (US); Ehood Garmiza, Neve Ziv (IL); Leah Shalev, Zichron-Yaakov (IL); Eliyahu Weissbrem, Rehovot (IL)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 256 days.

(21) Appl. No.: 13/863,831

(22) Filed: Apr. 16, 2013

(65) Prior Publication Data

US 2014/0310489 A1    Oct. 16, 2014

(51) Int. Cl.
  *G06F 3/06*    (2006.01)
(52) U.S. Cl.
  CPC .............. *G06F 3/065* (2013.01); *G06F 3/0614* (2013.01); *G06F 3/0683* (2013.01)
(58) Field of Classification Search
  CPC .......... G06F 17/30067; G06F 11/1076; G06F 9/5083; G06F 2211/1028; G06F 11/1471; G06F 3/067; G06F 3/064; G06F 17/30079; G06F 17/30575; G06F 3/065; G06F 11/1435; G06F 17/30581; G06F 3/0614; G06F 17/30194; G06F 3/0643
  USPC .......... 711/114, 170, 162, E12.103, E12.001, 711/E12.002, 159, 165, 202, 209; 707/E17.01, 999.01, E17.032, 827, 707/822, 737, 770, E17.089, 626, 644, 652, 707/821, 823, 828, 999.204
  See application file for complete search history.

(56) References Cited

U.S. PATENT DOCUMENTS

| 6,012,123 A | 1/2000 | Pecone et al. |
| 6,101,615 A | 8/2000 | Lyons |

(Continued)

FOREIGN PATENT DOCUMENTS

| CN | 1664793 A | 9/2005 |
| CN | 101997918 A | 3/2011 |

(Continued)

OTHER PUBLICATIONS

Sivathanu et al., "Improving Storage System Availability with D-GRAID," ACM Transactions on Storage, vol. 1, No. 2, May 2005, http://pages.cs.wisc.edu/~muthian/dgraid-tos.pdf.

(Continued)

*Primary Examiner* — Yong Choe
*Assistant Examiner* — Edward Waddy, Jr.
(74) *Attorney, Agent, or Firm* — Griffiths & Seaton PLLC

(57) ABSTRACT

Methods, apparatus and computer program products for a distributed system include dividing logical volume data into data subsets, and defining at least one distributedly storage configuration for the logical volume. Metadata for the logical volume is written to a first set of first metadata tables, and the first set of first metadata tables is divided into metadata subsets having a one-to-one correspondence with the data subsets. The metadata subsets are distributed among the multiple digital information devices, and the metadata is copied from the first set of first metadata tables to a second set of corresponding second metadata tables in a one-to-one correspondence with the first metadata tables. The second metadata tables are distributed among the multiple digital information devices, and upon modifying the metadata in a one of the first metadata tables while processing a storage request, the corresponding second metadata table is revised with the updated metadata.

20 Claims, 7 Drawing Sheets

(56) References Cited

U.S. PATENT DOCUMENTS

| | | |
|---|---|---|
| 6,775,738 B2 | 8/2004 | Ash et al. |
| 7,593,974 B2 | 9/2009 | Suzuki et al. |
| 7,657,509 B2 | 2/2010 | Clark et al. |
| 7,849,356 B2 | 12/2010 | Jones et al. |
| 7,945,732 B2 | 5/2011 | Koseki |
| 7,987,158 B2 | 7/2011 | Boyd et al. |
| 8,103,904 B2 | 1/2012 | Hafner et al. |
| 8,112,395 B2 | 2/2012 | Patel et al. |
| 8,156,368 B2 | 4/2012 | Chambliss et al. |
| 2002/0091897 A1 | 7/2002 | Chiu et al. |
| 2002/0170017 A1 | 11/2002 | Busser |
| 2004/0093464 A1 | 5/2004 | Hassner et al. |
| 2004/0128269 A1* | 7/2004 | Milligan et al. ............ 707/1 |
| 2006/0123270 A1 | 6/2006 | Forhan et al. |
| 2006/0294301 A1 | 12/2006 | Zohar et al. |
| 2007/0028145 A1 | 2/2007 | Gerhard et al. |
| 2007/0067667 A1 | 3/2007 | Ikeuchi et al. |
| 2007/0079083 A1* | 4/2007 | Gladwin et al. ............ 711/154 |
| 2008/0040553 A1 | 2/2008 | Ash et al. |
| 2008/0195807 A1 | 8/2008 | Kubo et al. |
| 2008/0201608 A1 | 8/2008 | Forhan et al. |
| 2009/0049050 A1 | 2/2009 | Whitehead |
| 2009/0089612 A1 | 4/2009 | Mathew et al. |
| 2011/0153606 A1* | 6/2011 | Kim et al. ............ 707/737 |
| 2011/0161299 A1 | 6/2011 | Prahlad et al. |
| 2011/0202792 A1 | 8/2011 | Atzmony |
| 2011/0208912 A1 | 8/2011 | Chambliss et al. |
| 2011/0208943 A1 | 8/2011 | Schott |
| 2011/0225453 A1 | 9/2011 | Spry et al. |
| 2011/0258391 A1 | 10/2011 | Atkisson et al. |
| 2011/0282835 A1* | 11/2011 | Cannon et al. ............ 707/622 |
| 2014/0310244 A1 | 10/2014 | Chambliss et al. |
| 2014/0310456 A1 | 10/2014 | Chambliss et al. |
| 2014/0310457 A1 | 10/2014 | Chambliss et al. |
| 2014/0310464 A1 | 10/2014 | Chambliss et al. |
| 2014/0310465 A1 | 10/2014 | Chambliss et al. |
| 2014/0310557 A1 | 10/2014 | Chambliss et al. |

FOREIGN PATENT DOCUMENTS

| | | |
|---|---|---|
| CN | 102185929 A | 9/2011 |
| WO | 2014170791 A3 | 10/2014 |

OTHER PUBLICATIONS

Ripberger et al., "IBM System Storage DS8000 Storage Virtualization Overview," IBM, Apr. 13, 2010.

Rodeh, "B-trees, Shadowing and Clones," ACM Transactions on Computational Logic, vol. V, No. N, IBM, Aug. 2007.

* cited by examiner

MANAGING METADATA AND DATA FOR A LOGICAL VOLUME IN A DISTRIBUTED AND DECLUSTERED SYSTEM

CROSS-REFERENCE TO RELATED APPLICATIONS

This application is related to U.S. patent applications titled "Essential Metadata Replication", "Parallel Destaging With Replicated Cache Pinning", "Fine-Grained Control of Data Placement", "Backup Cache With Immediate Availability", "Destaging Cache Data Using a Distributed Freezer" and "Logical Region Allocation With Immediate Availability" filed on even date with the present application, and which is incorporated herein by reference.

FIELD OF THE INVENTION

The present invention relates generally to data storage, and specifically to distributing metadata to one or more backup nodes of a storage system.

BACKGROUND

In computer storage systems (also referred to herein as storage subsystems), disk partitioning and logical volume management are used to manage physical storage devices such as hard disk drives. In disk partitioning, a single storage device is divided into multiple logical storage units referred to as partitions, thereby treating one physical storage device as if it were multiple disks. Logical volume management provides a method of allocating space on mass-storage devices that is more flexible than conventional partitioning schemes. In particular, a volume manager can concatenate, stripe together or otherwise combine regions (a region, also referred to herein as a partition, is a sequence of bytes having a specific length, typically one megabyte) into larger virtual regions that administrators can re-size or move, potentially without interrupting system use.

To manage a given volume, a partition table can be utilized to define the relationship between a logical address of a logical volume and physical regions (also known as blocks and partitions) on the physical storage device. Upon receiving a request to perform an input/output (I/O) operation at a specific logical address on the given volume, a storage system can utilize the partition table identify the physical location on a storage device that corresponds to the specific logical address.

SUMMARY

There is provided, in accordance with an embodiment of the present invention a method, including arranging multiple storage devices and multiple digital information devices having respective memories to communicate within a network, dividing data of a logical volume into data subsets, defining, for the logical volume, at least one storage configuration for the data subsets distributed among the respective storage devices, writing metadata for the logical volume to a first set of first metadata tables, each of the first metadata tables configured as a master metadata table, dividing the first set of first metadata tables into metadata subsets having a one-to-one correspondence with the data subsets, distributedly storing the metadata subsets among the multiple digital information devices, the storage configuration of the data subsets independent from the storing of the metadata subsets, copying the metadata from the first set of first metadata tables to a second set of corresponding second metadata tables in a one-to-one correspondence with the first metadata tables, each of the second metadata tables configured as a backup metadata table, distributedly storing the second metadata tables among the multiple digital information devices so that a given first metadata table and the corresponding second metadata table are stored to a different one of the multiple digital information devices, and so that the corresponding second metadata tables for the first metadata tables on a first of the digital information devices are distributed among at least an additional two of the digital information devices and upon modifying the metadata in a one of the first metadata tables while processing a storage request, updating the corresponding second metadata table with the updated metadata.

There is also provided, in accordance with an embodiment of the present invention an apparatus, including multiple storage devices and multiple digital information devices arranged on a network and having respective memories, and a separate processor coupled to each of the respective memories and configured to divide data of a logical volume into data subsets, to define, for the logical volume, at least one storage configuration for the data subsets distributed among the respective storage devices, to write metadata for the logical volume to a first set of first metadata tables, each of the first metadata tables configured as a master metadata table, to divide the first set of first metadata tables into metadata subsets having a one-to-one correspondence with the data subsets, to distributedly store the metadata subsets among the multiple digital information devices, the storage configuration of the data subsets independent from the storing of the metadata subsets, to copy the metadata from the first set of first metadata tables to a second set of corresponding second metadata tables in a one-to-one correspondence with the first metadata tables, each of the second metadata tables configured as a backup metadata table, and to distributedly store the second metadata tables among the multiple digital information devices so that a given first metadata table and the corresponding second metadata table are stored to a different one of the multiple digital information devices, and so that the corresponding second metadata tables for the first metadata tables on a first of the digital information devices are distributed among at least an additional two of the digital information devices, and upon modifying the metadata in a one of the first metadata tables while processing a storage request, a given one of the separate processors is configured to update the corresponding second metadata table with the updated metadata.

There is further provided, in accordance with an embodiment of the present invention a computer program product, the computer program product including a non-transitory computer readable storage medium having computer readable program code embodied therewith, the computer readable program code including computer readable program code configured to arrange multiple storage devices and multiple digital information devices having respective memories to communicate within a network, computer readable program code configured to divide data of a logical volume into data subsets, computer readable program code configured to define, for the logical volume, at least one storage configuration for the data subsets distributed among the respective storage devices, computer readable program code configured to write metadata for the logical volume to a first set of first metadata tables, each of the first metadata tables configured as a master metadata table, computer readable program code configured to divide the first set of first metadata tables into metadata subsets having a one-to-one correspondence with the data subsets, computer readable program code configured to distributedly store the metadata subsets among the multiple digital information devices, the storage configuration of the data subsets independent from the storing of the metadata subsets, computer readable program code configured to copy the metadata from the first set of first metadata tables to a second set of corresponding second metadata tables in a one-to-one correspondence with the first metadata tables, each of the second metadata tables configured as a backup metadata table, computer readable program code configured to distributedly store the second metadata tables among the multiple digital information devices so that a given first metadata table and the corresponding second metadata table are stored to a different one of the multiple digital information devices, and so that the corresponding second metadata tables for the first metadata tables on a first of the digital information devices are distributed among at least an additional two of the digital information devices, and computer readable program code configured to update, upon modifying the metadata in a one of the first metadata tables while processing a storage request, the corresponding second metadata table with the updated metadata.

BRIEF DESCRIPTION OF THE DRAWINGS

The disclosure is herein described, by way of example only, with reference to the accompanying drawings, wherein.

DETAILED DESCRIPTION OF EMBODIMENTS

Figure 1:
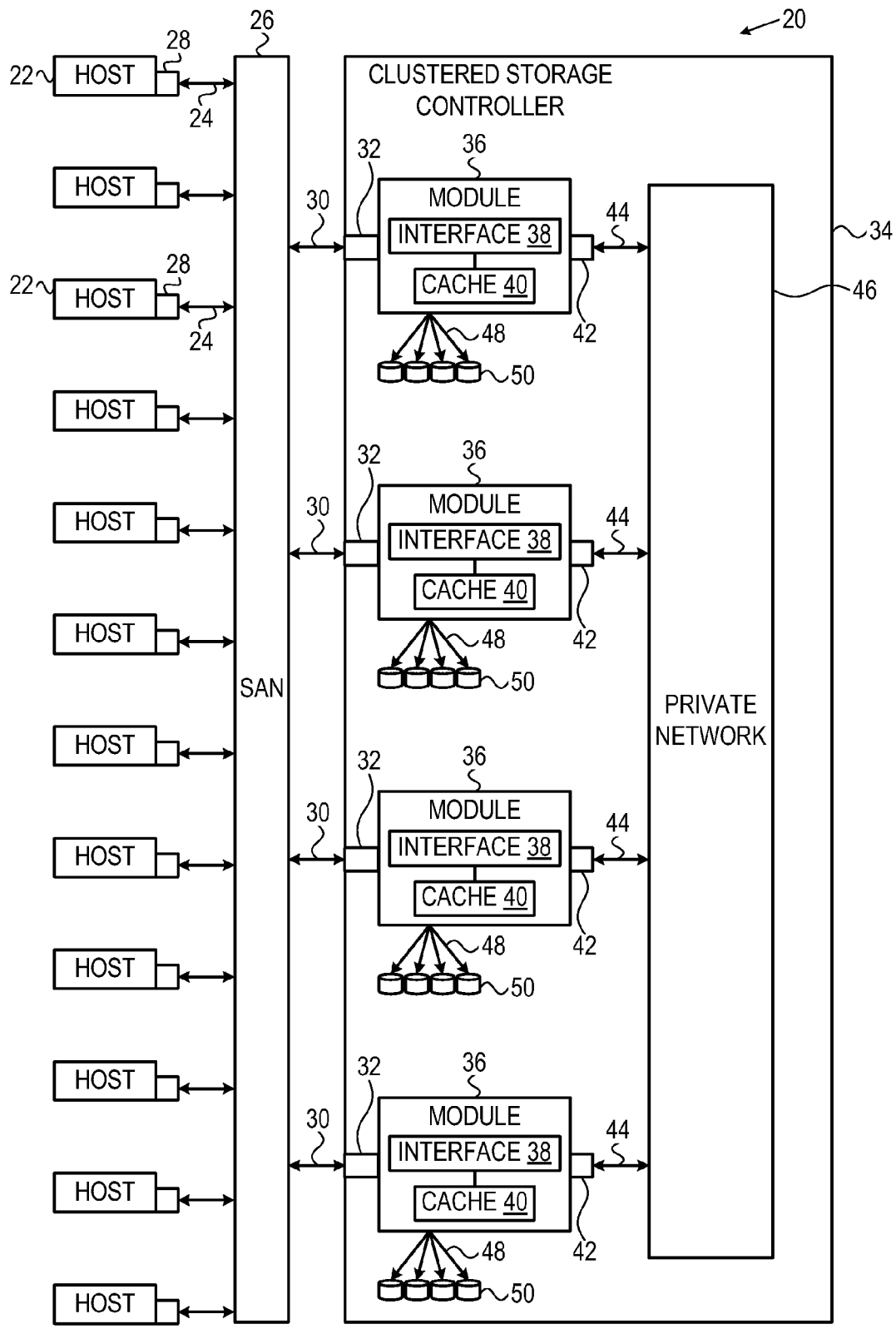
FIG. 1 is a block diagram that schematically illustrates a storage system, in accordance with an embodiment of the present invention.

When managing logical volumes, digital information devices such as modules of a clustered storage controller (described hereinbelow) typically implement a storage configuration when storing data on one or more storage devices. For example, a logical volume may store data to a Redundant Array of Inexpensive Disks (RAID) 6 8+2 storage configuration, and metadata detailing the storage configuration (i.e., how the data is stored to ten storage devices in a RAID array) can be stored to a partition table.

In addition to data and metadata, a digital information device typically implements a write cache configured to store cache data for the logical volume. For a given logical volume, the data, the metadata and the cache data may be referred to herein as layers of the given logical volume.

Embodiments of the present invention provide methods and systems for storing layers of a logical volume to a distributed system in order to provide balance and scalability, as well as resiliency during error recovery. In embodiments described herein the layers comprise logical volume data, metadata and operational data. As described hereinbelow examples of metadata include, but are not limited to, partition table data, transaction distribution data and disk distribution data. Examples of operational data are described hereinbelow. While embodiments herein describe three layers of a logical volume (i.e., data, metadata and operational), any number of layers is considered to be within the spirit and scope of the present invention.

In embodiments described herein, the distributed system may be implemented on a clustered storage controller comprising multiple modules, wherein each module comprises multiple storage devices. The clustered storage controller can implement a distributed file system (also known as a clustered file system) which can be shared by being simultaneously mounted on the multiple modules. The ability of the clustered storage controller to distribute specific data (e.g., volume data, volume metadata and volume cache data) among the storage devices in the clustered storage controller is referred to herein as "distributedly storing" the specific data.

For example, volume data for a given logical volume can be distributedly stored by defining a RAID storage configuration utilizing at least four storage devices (i.e., RAID 6 2+2) for each volume data stripe. Likewise, metadata that defines the RAID storage configuration for the given logical volume may also be distributedly stored to the storage devices in order to enhance resiliency of the metadata, as described hereinbelow.

The distributed system may comprise storage devices and multiple digital information devices (e.g., modules of a storage controller, as described hereinbelow) having respective memories that are configured to communicate within a network. While the configuration described hereinbelow comprises each module of a storage controller having respective storage devices, other configurations are considered to be within the spirit and scope of the present invention. For example, the storage devices may be arranged in a disk enclosure or a "Just a Bunch of Disks" (JBOD) configuration that is coupled to the network.

In some embodiments, a different (and independent) resiliency scheme can be implemented for each layer of a given logical volume. For example, data can be stored in a RAID 6 configuration that is arranged to recover from two hardware failures, while metadata and cache data can be stored to a storage configuration that is arranged to recover from three hardware failures.

Examples of operational data layers that may be maintained using embodiments of the present invention include, but are not limited to, input/output (I/O) intensity statistics, time-dependent workload patterns, quality of service requirements, data compressibility, presence and degree of data duplication, and other data which may be used to improve the effectiveness of the storage system's handling of particular elements of data. In some embodiments, if a master table storing operational data is lost due to a component failure, it is typically desirable to restore the master table so that the improved operations can be resumed, but the guarantee of restoration need not be as strong, and the speed of restoration need not be as fast as for the volume's data. Thus, it may be useful to apply different protection systems, and sometimes a lower level of resilience, to these operational data layers.

The independent distribution of master and backup tables for different operational data layers, including metadata and operation data such as cache data, enables that upon a module failure, the actions of reconfiguring a backup to be a new master and of creating new backups can be performed separately on each layer, and these actions may select different modules for these roles on different layers for operational data corresponding to a specific data subset. The independence enables that different decisions can be made at each layer regarding the degree of fault tolerance, the strictness of maintaining balance, the granularity of distributing the layer, and the urgency of restoring the layer after a failure. These separate decisions offer the benefit of an improved system design that makes more effective use of limited resources.

Therefore, based on speed and resiliency requirements, embodiments of the present invention enable each layer of a logical volume to be independently optimized using different combinations of parameters such as redundancy level, space efficiency, and speed and/or complexity of access and update.

FIG. 1 is a block diagram that schematically illustrates a data processing storage subsystem 20, in accordance with a disclosed embodiment of the invention. The particular subsystem shown in FIG. 1 is presented to facilitate an explanation of the invention. However, as the skilled artisan will appreciate, the invention can be practiced using other computing environments, such as other storage subsystems with diverse architectures and capabilities.

Storage subsystem 20 receives, from one or more host computers 22, input/output (I/O) requests, which are commands to read or write data at logical addresses on logical volumes. Any number of host computers 22 are coupled to storage subsystem 20 by any means known in the art, for example, using a network. Herein, by way of example, host computers 22 and storage subsystem 20 are assumed to be coupled by a Storage Area Network (SAN) 26 incorporating data connections 24 and Host Bus Adapters (HBAs) 28. The logical addresses specify a range of data blocks within a logical volume, each block herein being assumed by way of example to contain 512 bytes. For example, a 10 KB data record used in a data processing application on a given host computer 22 would require 20 blocks, which the given host computer might specify as being stored at a logical address comprising blocks 1,000 through 1,019 of a logical volume. Storage subsystem 20 may operate in, or as, a SAN system.

Storage subsystem 20 comprises a clustered storage controller 34 coupled between SAN 26 and a private network 46 using data connections 30 and 44, respectively, and incorporating adapters 32 and 42, again respectively. In some configurations, adapters 32 and 42 may comprise host SAN adapters (HSAs). Clustered storage controller 34 implements clusters of storage modules 36, each of which includes an interface 38 (in communication between adapters 32 and 42), and a cache 40. Each storage module 36 is responsible for a number of storage devices 50 by way of a data connection 48 as shown.

While the configuration of storage subsystem 20 in FIG. 1 shows each module 36 comprising an adapter 32 that is configured to communicate with SAN 26, other configurations of the storage subsystem are considered to be within the spirit and scope of the present invention. For example, in an alternative configuration, adapter 32 is included in a subset of modules 36.

As described previously, each storage module 36 further comprises a given cache 40. However, it will be appreciated that the number of caches 40 used in storage subsystem 20 and in conjunction with clustered storage controller 34 may be any convenient number. While all caches 40 in storage subsystem 20 may operate in substantially the same manner and comprise substantially similar elements, this is not a requirement. Each of the caches 40 may be approximately equal in size and is assumed to be coupled, by way of example, in a one-to-one correspondence with a set of physical storage devices 50, which may comprise disks. In one embodiment, physical storage devices may comprise such disks. Those skilled in the art will be able to adapt the description herein to caches of different sizes.

While the configuration of storage subsystem 20 shown in Figure has the storage subsystem storing data to physical storage devices 50, other storage apparatuses are considered to be within the spirit and scope of the present invention. For example, storage subsystem 20 may store data to one or more data clouds or storage virtualization devices (SVD).

Each set of storage devices 50 comprises multiple slow and/or fast access time mass storage devices, herein below assumed to be multiple hard disks. FIG. 1 shows caches 40 coupled to respective sets of storage devices 50. In some configurations, the sets of storage devices 50 comprise one or more hard disks, which can have different performance characteristics. In response to an I/O command, a given cache 40, by way of example, may read or write data at addressable physical locations of a given storage device 50. In the embodiment shown in FIG. 1, caches 40 are able to exercise certain control functions over storage devices 50. These control functions may alternatively be realized by hardware devices such as disk controllers (not shown), which are linked to caches 40.

Each storage module 36 is operative to monitor its state, including the states of associated caches 40, and to transmit configuration information to other components of storage subsystem 20 for example, configuration changes that result in blocking intervals, or limit the rate at which I/O requests for the sets of physical storage are accepted.

Routing of commands and data from HBAs 28 to clustered storage controller 34 and to each cache 40 may be performed over a network and/or a switch. Herein, by way of example, HBAs 28 may be coupled to storage modules 36 by at least one switch (not shown) of SAN 26, which can be of any known type having a digital cross-connect function. Additionally or alternatively, HBAs 28 may be coupled to storage modules 36.

In some embodiments, data having contiguous logical addresses can be distributed among modules 36, and within the storage devices in each of the modules. Alternatively, the data can be distributed using other algorithms, e.g., byte or block interleaving. In general, this increases bandwidth, for instance, by allowing a volume in a SAN or a file in network attached storage to be read from or written to more than one given storage device 50 at a time. However, this technique requires coordination among the various storage devices, and in practice may require complex provisions for any failure of the storage devices, and a strategy for dealing with error checking information, e.g., a technique for storing parity information relating to distributed data. Indeed, when logical unit partitions are distributed in sufficiently small granularity, data associated with a single logical unit may span all of the storage devices 50.

While such hardware is not explicitly shown for purposes of illustrative simplicity, clustered storage controller 34 may be adapted for implementation in conjunction with certain hardware, such as a rack mount system, a midplane, and/or a backplane. Indeed, private network 46 in one embodiment may be implemented using a backplane. Additional hardware such as the aforementioned switches, processors, controllers, memory devices, and the like may also be incorporated into clustered storage controller 34 and elsewhere within storage subsystem 20, again as the skilled artisan will appreciate. Further, a variety of software components, operating systems, firmware, and the like may be integrated into one storage subsystem 20.

Storage devices 50 may comprise a combination of high capacity hard disk drives and solid state disk drives. In some embodiments each of storage devices 50 may comprise a logical storage device. In storage systems implementing the Small Computer System Interface (SCSI) protocol, the logical storage devices may be referred to as logical units, or LUNs. While each LUN can be addressed as a single logical unit, the LUN may comprise a combination of high capacity hard disk drives and/or solid state disk drives.

Figure 2:
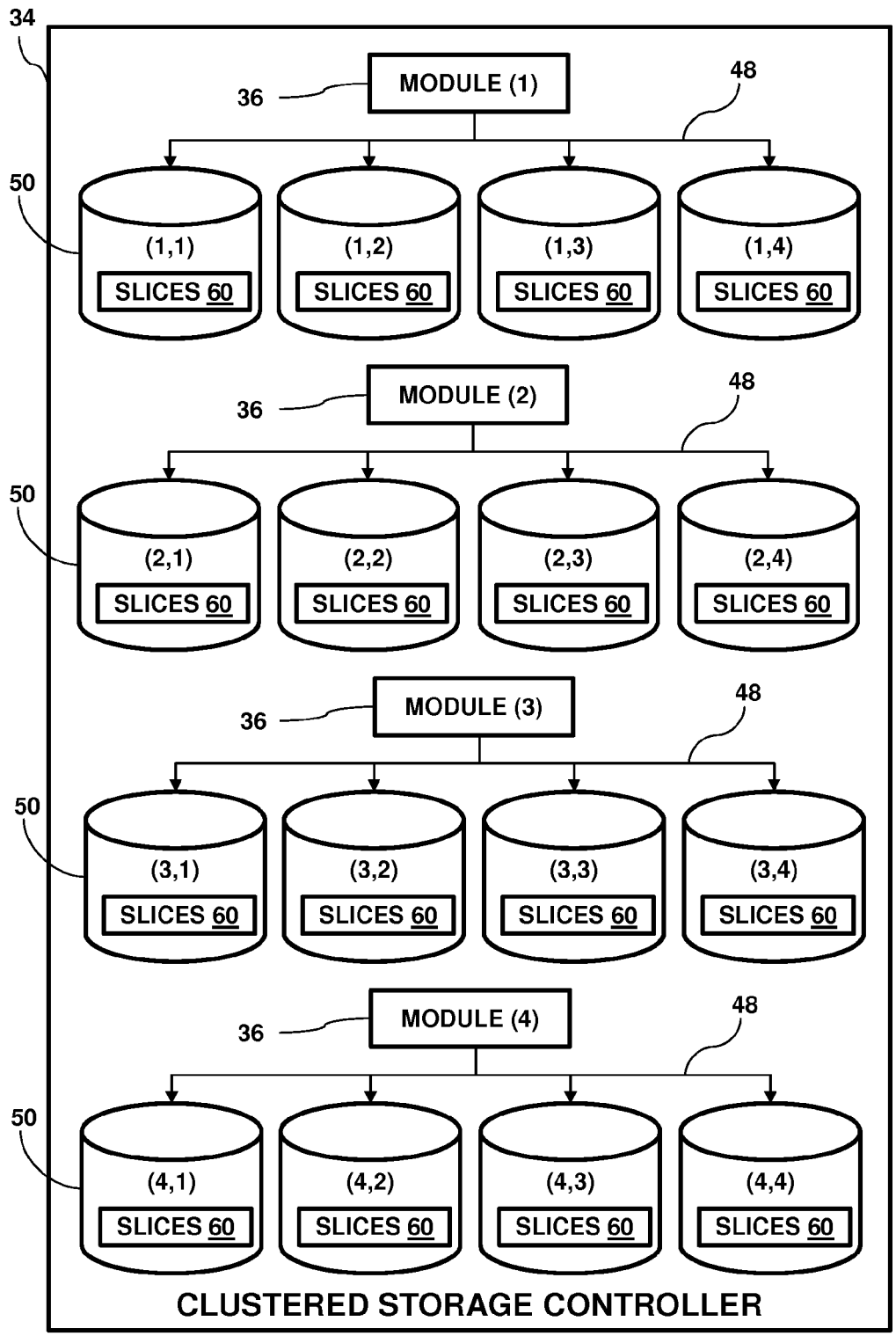
FIG. 2 is a block diagram that schematically illustrates an example of storage management units stored on a storage system, in accordance with an embodiment of the present invention.

FIG. 2 is a block diagram that schematically illustrates an example of storage management units (SMU) configured as slices 60 stored on storage devices 50 of clustered storage controller 34 (also referred to herein as a storage system), in accordance with an embodiment of the present invention. While the embodiments herein describe distributing metadata storage for slices 60, distributing metadata storage for other types of storage management units is considered to be within the spirit and scope of the present invention. For example, the embodiments described herein can be used to distribute metadata for other types of storage management units such as logical volumes and storage pools.

Additionally, in the embodiments described herein, each module 36 may be referenced by an identifier (A), where A is an integer representing a given module 36. As shown in FIG. 2, there are four modules 36 that may be referenced as module 36(1), module 36(2), module 36(3) and module 36(4).

Furthermore, each storage device 50 may be referenced by an ordered pair (A,B), where A is defined above, and where B is a number representing a given storage device 50 coupled to the given module via data connection 48. For example, storage devices 50(3,1), 50(3,2), 50(3,3) and 50(3,4) are coupled to module 36(3) via data connection 48.

Figure 3A:
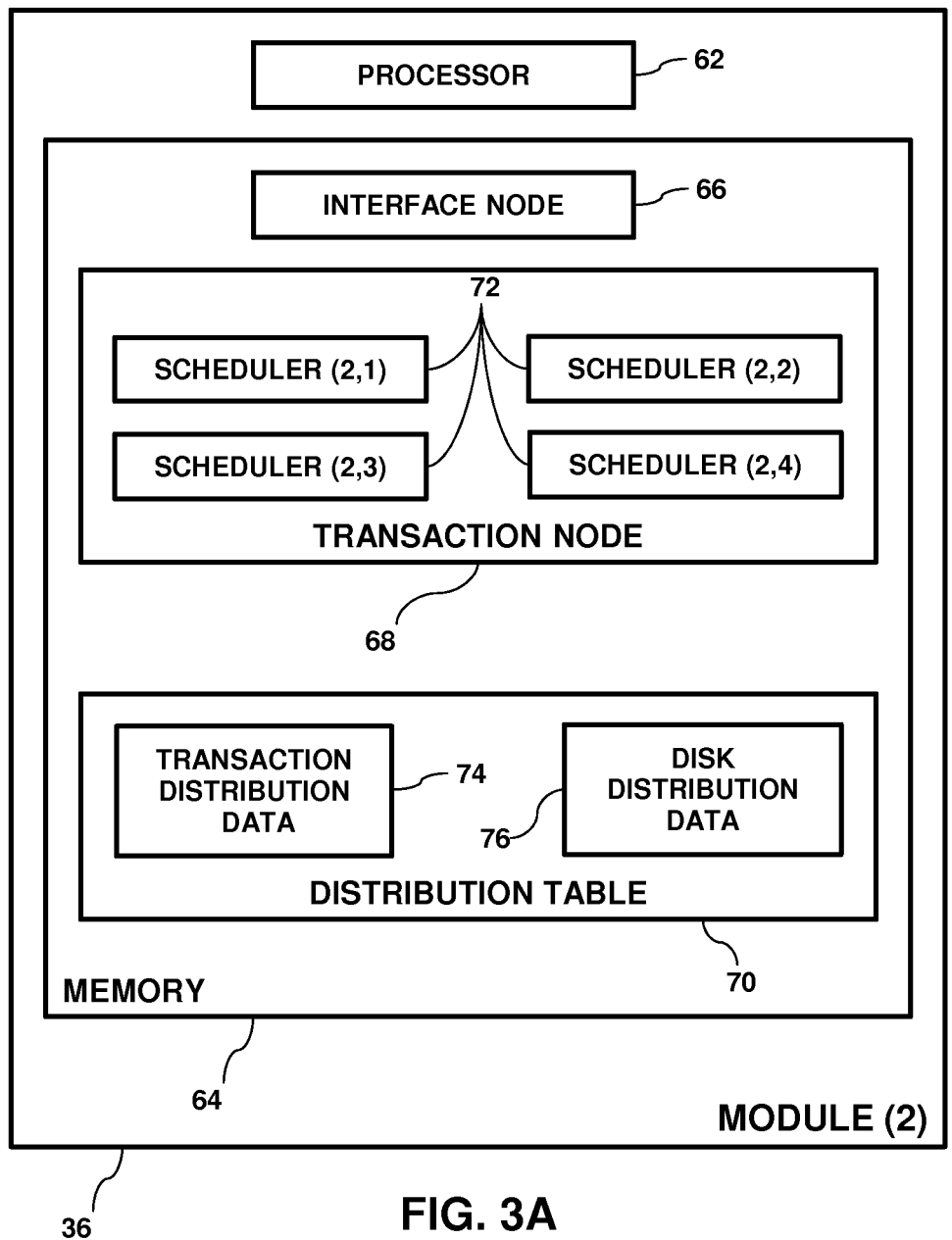
FIGS. 3A-3C, referred to collectively as FIG. 3, are block diagrams that schematically show functional elements of a module of the storage system, in accordance with an embodiment of the present invention.

FIG. 3A is a block diagram that schematically illustrates functional elements of module 36, in accordance with an embodiment of the present invention. Module 36 comprises a processor 62 and a memory 64. For a given module 36 configured to include adapter 32, memory 64 comprises an interface node 66 (i.e., not all memories 36 in storage system 20 include the interface node). Memory 36 also comprises a transaction node 68 and a distribution table 70. In operation, processor 62 executes interface node 66 and transaction node 68 from memory 64.

Processor 62 typically comprises a general-purpose computer, which is programmed in software to carry out the functions described herein. The software may be downloaded to processor 62 in electronic form, over a network, for example, or it may be provided on non-transitory tangible media, such as optical, magnetic or electronic memory media. Alternatively, some or all of the functions of processor 62 may be carried out by dedicated or programmable digital hardware components, or using a combination of hardware and software elements.

Interface node 66 comprises a software application that is configured to receive I/O requests from a given host computer 22, and to convey the I/O request to a given transaction node 68. Additionally, upon the given transaction node completing the I/O request, interface node 66 conveys a result of the I/O request to the given host computer. For example, if the I/O request comprises a write operation, then the conveyed result may comprise an acknowledgement of the write. Alternatively, if the I/O request comprises a read operation, then the conveyed result may comprise data retrieved from storage devices 50.

Transaction node 68 comprises a software application that processes I/O requests via multiple schedulers 72, which manage a set of slices 60. While the configuration of transaction node 68 shown in FIG. 3A comprises four schedulers 72, any number of schedulers is considered to be within the spirit and scope of the present invention. In some embodiments, processor 62 may execute each scheduler 72 on a separate thread (also known as a logical core) of the processor.

In embodiments described herein, each scheduler 72 may be referenced by an ordered pair (A,C), where A is defined above, and C is a number representing a given scheduler 72 executing within the given module. In the example shown in FIG. 3A, the first scheduler 72 in module 36(2) may be referred to herein as scheduler 72(2,1), the second scheduler 72 in module 36(2) may be referred to herein as scheduler 72(2,2), the third scheduler in module 36(2) may be referred to herein as scheduler 72(2,3), and the fourth scheduler 72 in module 36(2) may be referred to herein as scheduler 72(2,4).

As described supra, storage controller 34 may configure a logical volume as a set of slices 60, wherein each of the slices comprises a set of regions on a given storage device 50. For example, a given logical volume may comprise four slices 60 spread over storage devices 50(1,2), 50(2,3), 50(3,4) and 50(4,2). There may be instances where a given storage device stores more than one slice for a given logical volume. Additionally, as described in detail hereinbelow, processor 62 may store multiple copies of a given slice. For example, processor 62 may store a first copy of a given slice 60 on a first storage device 50 (also referred to herein as the primary storage device for the given slice), and an additional copy of the given slice on a second storage device 50 (also referred to herein as the secondary storage device for the given slice).

In embodiments of the present invention, each slice 60 can be associated with a first scheduler 72 that can be configured as a master scheduler, and one or more additional schedulers 72 that can be configured as backup schedulers. Differences between the master and the backup schedulers are described hereinbelow. In the event of a failure of the master scheduler, processor 62 can reconfigure one of the backup schedulers to function as the master scheduler, thereby ensuring the continuous availability of data stored in storage controller 34.

As described supra, processor 62 may store a first copy of a given slice 60 on a primary storage device 50, and an additional copy of the given slice on one or more secondary storage devices 50. In the event of a failure of the primary storage device, processor 62 can reconfigure one of the secondary storage devices to function as the primary storage device, thereby ensuring the continuous availability of data stored in storage controller 34.

Processor 62 can store associations between the slices, the schedulers and the storage devices to distribution table 70. Distribution table 70 comprises transaction distribution data 74 and disk distribution data 76. Transaction distribution data 74 can be configured to store associations between the slices and the schedulers, and disk distribution data 76 can be configured to store associations between the slices and the storage devices.

Figure 3B:
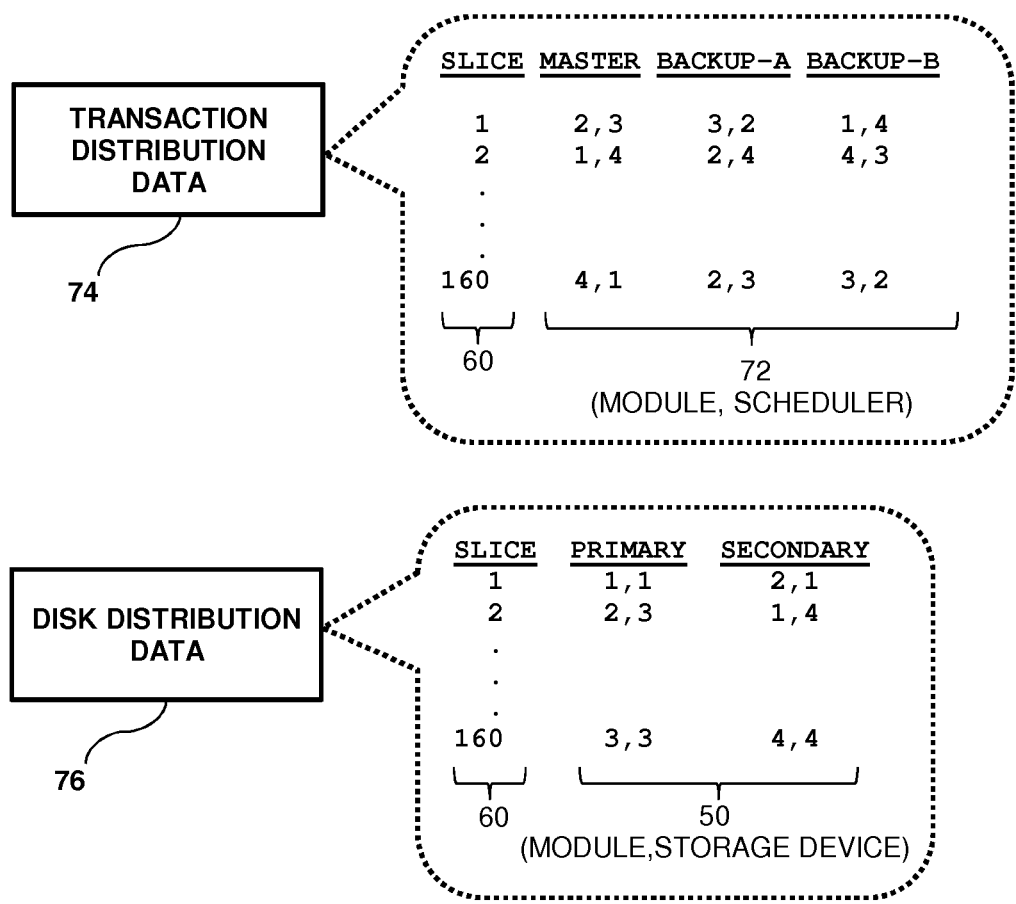

FIG. 3B is block diagram that schematically shows example entries in transaction distribution data 74 and disk distribution data 76, in accordance with an embodiment of the present invention. In the example shown in FIG. 3B, each slice 60 is associated with a master scheduler 72 and two backup schedulers 72, and a primary and a secondary storage device 50.

In the embodiments described herein, each slice may be referenced by an identifier (D), where D is a number representing a given slice 60. In the configuration shown in FIG. 3B-3C, storage controller 34 comprises 160 slices 60 that can be referenced as slice 60(1)-slice 60(160). Identifier D is also referred to herein as a slice number, so that each slice 60 has an associated slice number, and in the example D is an integer between 1 and 160.

As shown in transaction distribution data 74, scheduler 72(2,3) is configured as the master scheduler and schedulers 72(3,2) and 72(1,4) are configured as the backup schedulers (i.e., BACKUP-A and BACKUP-B as shown the figure) for slice 160(1). Additionally, as shown in disk distribution data 76 for slice 60(1), storage device 50(1,1) is configured as a primary storage device and storage device 50(2,1) is configured as a secondary storage device.

Figure 3C:
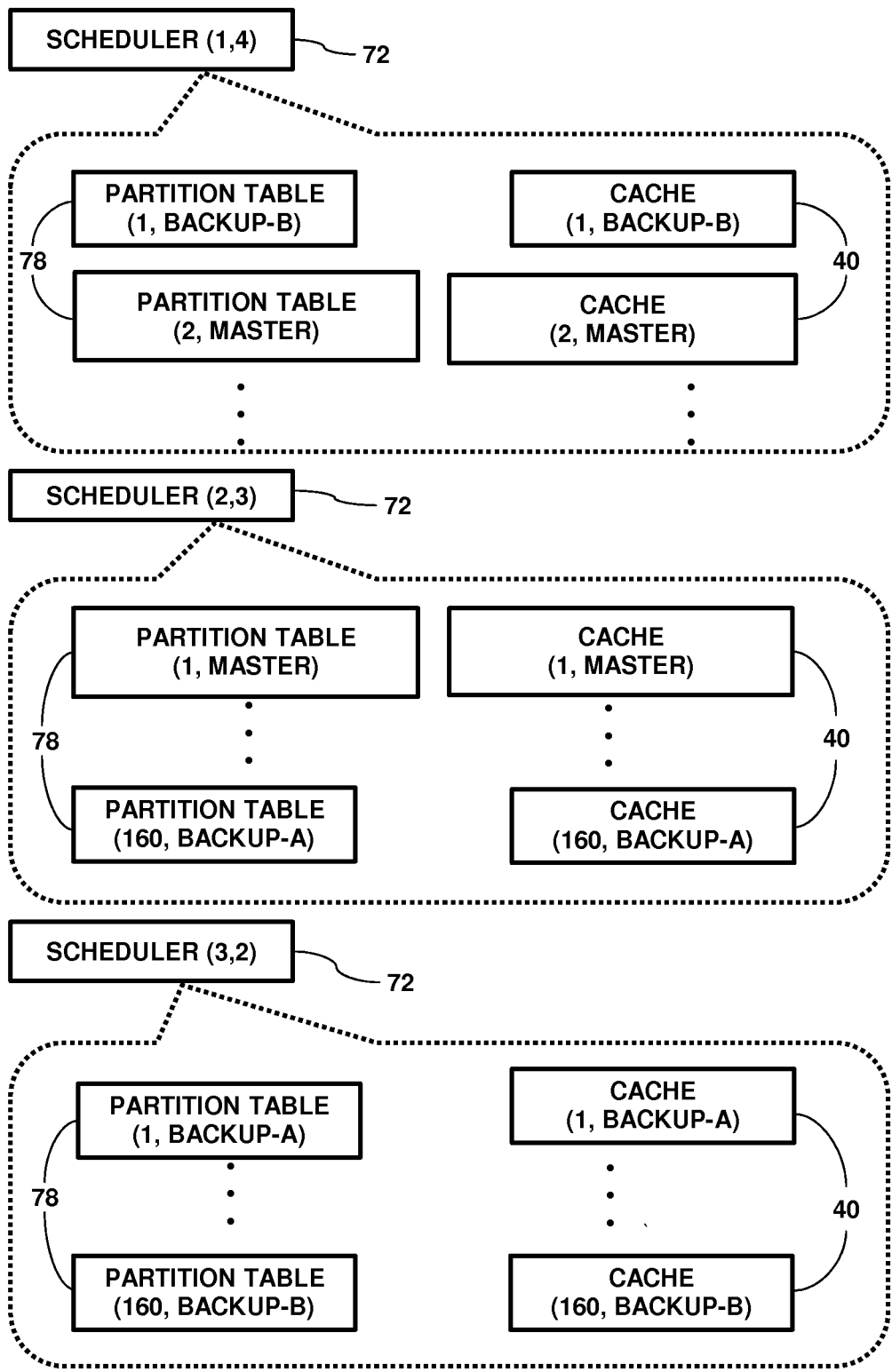

While the configuration of disk distribution data in FIG. 3C shows slices 60 stored Redundant Array of Inexpensive Disks (RAID) 10 configuration (i.e., each slice 60 is mirrored once among multiple storage devices 50), other storage configurations are considered to be within the spirit and scope of the present invention. For example, slices 60 may be stored in a RAID 6 (e.g., a RAID 6 6+2 or a RAID 6 8+2) configuration.

As shown in the Figures, for a given slice 160, the master scheduler, the backup scheduler(s), the primary storage device and the secondary storage device(s) can be distributed among different modules 36 of storage system 20. Additionally, each module 36 may store any number (including zero) of master and backup schedulers 72.

FIG. 3C is a block diagram that schematically illustrates schedulers 72(1,4), 72(2,3) and 72(3,2) in accordance with an embodiment of the present invention. Each scheduler 72 comprises pairs of partition tables 78 and caches 40, wherein each of the pairs is associated with a given slice 60. Each entry in a given partition table 78 corresponds to a partition (i.e., a region) on a given storage device 50, and comprises a data structure (e.g., an array) that enables processor 62 to map a given volume number and logical address to the partition. Operation of caches 40 is described in FIG. 1, hereinabove.

As described supra, each scheduler 72 can be associated with a given slice 60 and can function as either a master scheduler or a backup scheduler for the given slice. In the example shown in FIGS. 3B-3C, each slice 60 has a master scheduler 72 ("MASTER") and two backup schedulers 72 ("BACKUP-A" and "BACKUP-B"). Likewise, each partition table 78 may be referenced by an ordered pair (D,E), where D is a number representing a given slice 60, and E describes a role of a given partition table 78, and each cache 40 may be referenced by an ordered pair (D,F), where D is defined above, and F describes a role of a given cache 40. In embodiments described herein each slice 60 has a master cache 40 and two backup caches 40 (i.e., BACKUP-A and BACKUP-B).

Continuing the example described supra, the schedulers shown in FIG. 3C comprise the schedulers associated with slice 60(1). As shown in the Figure, scheduler 72(2,3) comprises partition table 78(1, MASTER) and cache 40(1, MASTER), scheduler 72(3,2) comprises partition table 78(1, BACKUP-A) and cache 40(1, BACKUP-A), and scheduler 72(1,4) comprises partition table 78(1, BACKUP-B) and cache 40(1, BACKUP-B).

In embodiments described herein, processor 62 can map an I/O request to a given scheduler 72, as opposed to mapping the I/O request to a given module 36 or a given storage device 50. By mapping I/O requests to schedulers 72, embodiments of the present convention "decouple" partition tables 78 from storage devices 50. In other words, upon receiving an I/O request, interface node 66 may convey the I/O request to a first module 36 executing a given scheduler 72 comprising a given partition table 78, wherein the given partition table references a given storage device 50 coupled to a second module 36.

In operation, a given partition table 78 can store metadata that details a storage configuration for the slice associated with the given partition table. Examples of metadata for each partition in a given partition table 78 include, but are not limited to:

- A volume number of a given slice 60 associated with the partition.
- A starting logical address for the partition.
- A location (i.e., an in-disk address, e.g., a track number) on a given storage device 50 for the partition.
- Timestamps indicating the last time the partition was accessed and/or updated.
- One or more flags.
- A hash table entry. Partition table 78 may include a hash table that enables processor 62 to rapidly translate a given volume number and logical address to an entry in the partition table.
- Pointers to next and previous partitions in a given volume.

In addition to the partition tables, metadata may also refer to transaction distribution data 74 and disk distribution data 76 that processor 62 can replicate among modules 36.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system". Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Python, Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Distributed Data and Metadata Management

Figure 4:
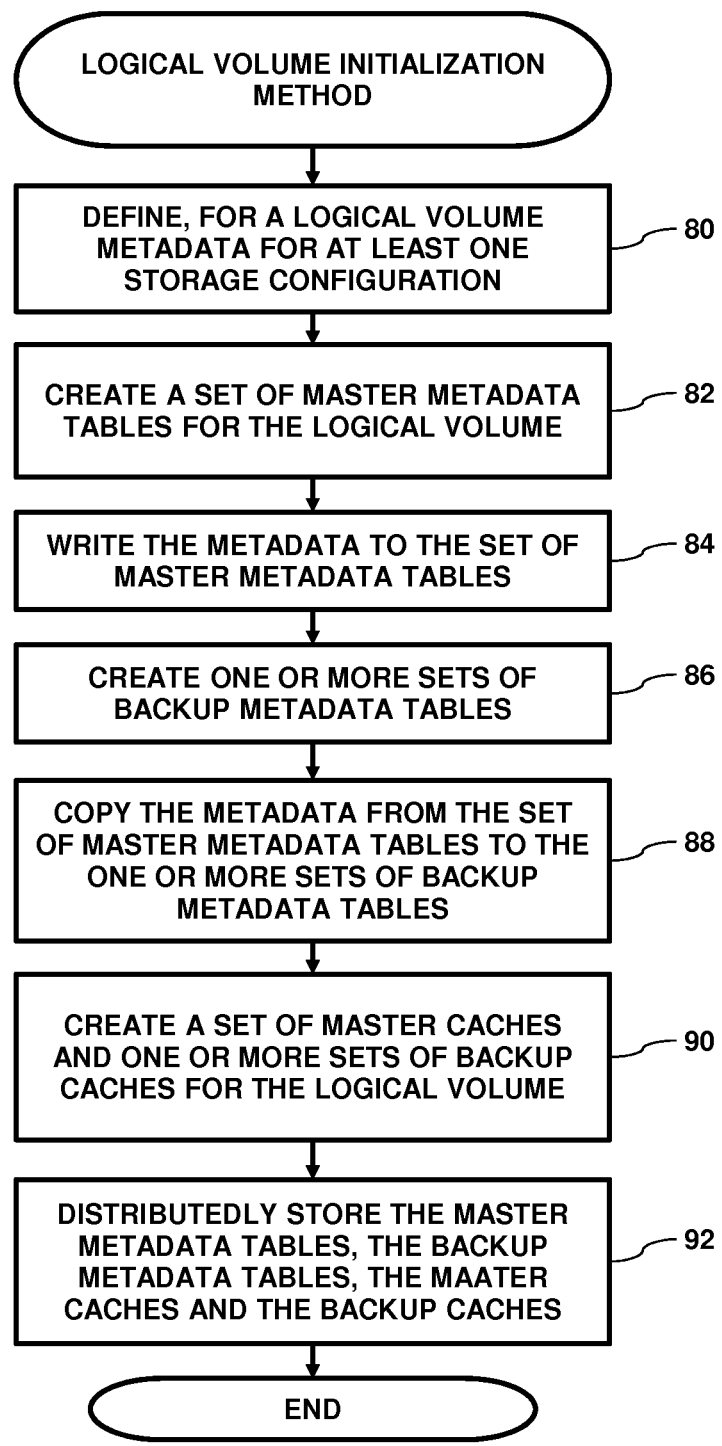
FIG. 4 is a flow diagram that schematically illustrates a method of initializing a logical volume, in accordance with an embodiment of the present invention.

FIG. 4 is a flow diagram that schematically illustrates a method of initializing a logical volume whose data is stored on storage devices 50, in accordance with an embodiment of the present invention. In embodiments described herein, processor 62 divides data of the logical volume into data subsets (e.g., slices 60), and managing the logical volume comprises managing one or more storage configurations, metadata and caches 40 for the data subsets. In the example described in the flow diagram, processor 62 stores the metadata to metadata tables such as partition tables 78.

In an initial step 80, processor 62 defines metadata for at least one storage configuration (e.g., a RAID configuration) for a logical volume whose data is distributed among storage devices 50. For example, processor 62 may store the logical volume as multiple slices 60 on storage devices 50, and the slices may be configured to store data in more than one RAID configurations. Maintaining multiple RAID configurations for different slices 60 of a given logical volume is described in more detail in U.S. patent application "Fine-Grained Control of Data Placement", referenced above.

As described supra, processor 62 can store a logical volume's data to multiple slices 60, and define a metadata table (e.g., a given partition table 78) and a given cache 40 for each of the slices. In a first create step 82, processor 62 creates a first set of multiple first metadata tables, and configures each of the first metadata tables as a master metadata table.

In a first write step 84, processor 62 writes the defined metadata to the first set of first metadata tables, and divides the first set of the first metadata tables into metadata subsets having a one-to-one correspondence with the data subsets. Each of the first metadata tables may be referred to herein as a master metadata table. Likewise, the first set of first metadata tables may be referred to as a set of master metadata tables.

In a second create step 86, processor creates a second set of second metadata tables, and configures each of the second metadata tables as a backup metadata table, so that the second metadata tables have a one-to-one correspondence with the first metadata tables. Each of the second metadata tables may be referred to herein as a backup metadata table. Likewise, the second set of second metadata tables may be referred to as a set of backup metadata tables. In a copy step 88, processor 62 copies metadata from the set of master metadata tables to the set of backup metadata tables.

In addition to metadata, processor 62 may maintain an additional layer of operational data for a given logical volume. In operation operational data tables are configured to store operational data. In embodiments described herein the operational data tables comprises caches 40, and the operational data comprises cache data.

In a cache create step 90, processor 62 creates a first set of first caches 40, divides the first set of the first cache tables into cache subsets having a one-to-one correspondence with the data subsets, and configures each of the first caches as a master cache, thereby creating a set of master caches. Processor 62 also creates at least one second set of second caches 40 and configures each of the second caches as a backup cache, thereby creating a set of backup caches. In some embodiments, the backup caches have a one-to-one correspondence with the master caches.

Finally, in a distribution step 92, processor 62 distributedly stores, among the respective memories of modules 36, the set of master metadata tables, the set of backup metadata tables, the set of master caches 40 and the set of backup caches 40. When distributing the metadata tables, processor 62 can balance the metadata table distribution among modules 36 so that a given master metadata table and its corresponding backup metadata table are stored on different modules 36, and so that the corresponding second metadata tables for the first metadata tables on a first module 36 are distributed among at least two additional modules 36.

In embodiments of the present invention, the storage configuration of the data subsets can be independent of the distributed storage configuration of the master and the backup metadata tables and the master and the backup caches. Additionally the distributed storage configuration of the master and the backup metadata tables may be independent of the distributed storage of the master and the backup caches. For example, processor 62 can configure system 20 so that a given one of the data subsets does not share a failure domain with the corresponding master and backup metadata tables and the corresponding master and backup caches, as described in the configuration shown in FIG. 3.

Likewise, when distributing the caches, processor 62 can balance the cache distribution among modules 36 so that a given master cache 40 and its corresponding backup cache 40 are stored on different modules 36, and so that the corresponding second caches for the first caches on a first module 36 are distributed among at least two additional modules 36.

In some embodiments, processor 62 can distributedly store the second metadata tables so that the corresponding second metadata tables for the first metadata tables in each of the metadata subsets are distributed among at least three of the digital information devices. Likewise, processor 62 can distributedly store the second caches so that the corresponding second caches for the first caches in each of the cache subsets are distributed among at least three of the digital information devices.

In additional embodiments, the metadata can be divided into the multiple metadata tables so that a typical storage operation (e.g., a read or a write operation) can be performed referencing no more than a small number of the separate metadata tables and caches. For example, read and write operations may reference a single metadata table and a single cache. As a result, when operations are distributed among the modules according to the residence of the master metadata table, the work of maintaining the metadata can be spread among the modules.

Once the logical volume is initialized using the steps described in FIG. 4, processor 62 can process storage commands that modify a given master metadata table and/or a given cache 40. For example, while processing a request to write data to a logical volume, processor 62 can store the data to a given master cache 40, and modify a timestamp in a given master metadata table.

Figure 5:
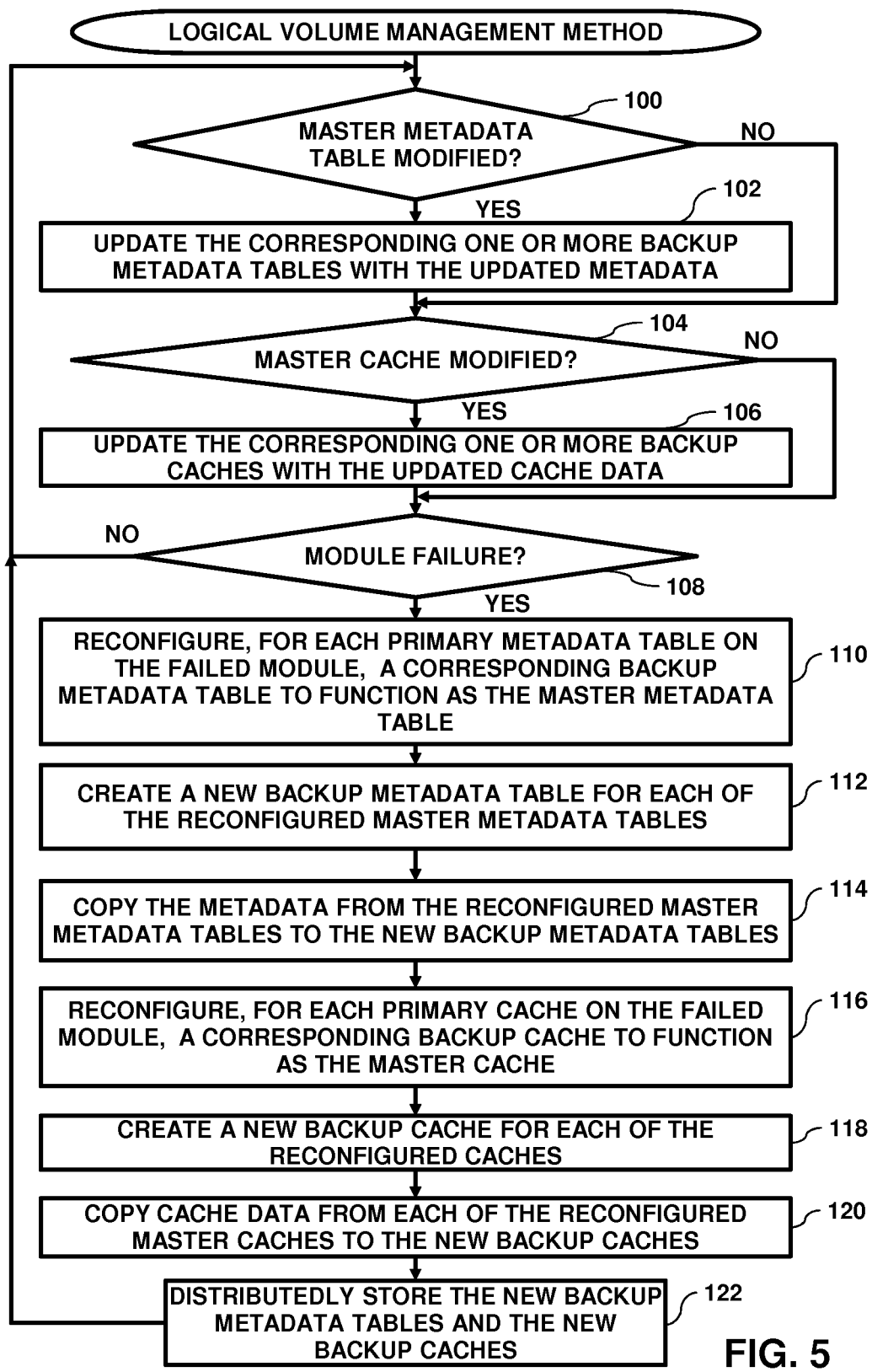
FIG. 5 is a flow diagram that schematically illustrates a method of managing a logical volume, in accordance with an embodiment of the present invention.

FIG. 5 is a flow diagram that illustrates a method of managing the logical volume initialized in the steps described in FIG. 4. In a first comparison step 100, if the metadata in a given master metadata table is modified (e.g., the processor modifies the metadata while processing a storage operation), then in a first update step 102, the processor updates the corresponding backup metadata table with the modified metadata.

In a second comparison step 104, if cache data in a given master cache 40 is modified, then in a second update step 106, the processor updates the corresponding backup cache 40 with the modified cache data. Returning to step 100, if the metadata in the given master metadata table was not updated, then the method continues with step 104.

In a third comparison step 108, if a given processor 62 in a first module 36 detects a hardware and/or a software failure in a second given module 36, then in a first reconfiguration step 110, the given processor reconfigures, for each master metadata table that was stored on the failed module, the corresponding backup metadata table as a new master metadata table. In embodiments where there is more than one backup metadata table for each master metadata table, the given processor can reconfigure, for each master metadata table that was stored on the failed module, one of the corresponding backup metadata tables as the new master metadata table.

In some embodiments, storage controller 34 may be configured to maintain a specific number of backup metadata tables for each master metadata tables. Therefore, in a first creation step 112, the given processor creates a new second metadata table for each of the new master metadata tables, configures the new second metadata tables as backup metadata tables, and in a first copy step 114, the given processor copies the metadata from each of the new master metadata tables to the corresponding new backup metadata tables.

In a second reconfiguration step 116, the given processor reconfigures, for each master metadata table that was stored on the failed module, the corresponding backup cache 40 as a new master cache. In embodiments where there is more than one backup caches for each master cache, the given processor reconfigures, for each master cache 40 that was stored on the failed module, one of the corresponding backup caches 40 as the new master cache.

In some embodiments, storage controller 34 may be configured to maintain a specific number of backup caches 40 for each master cache 40. Therefore, in a second creation step 118, the given processor creates a new second cache 40 for each of the new master caches, configures the new second caches as backup caches, and in a second copy step 120, the given processor copies the cache data from each of the new master caches to the corresponding new backup cache.

Finally, in a distribution step 122, the given processor distributedly stores, among modules 36, the new backup metadata tables and the new backup caches, and the method returns to step 100. When distributing the new backup metadata tables, the given processor can balance the metadata table distribution among modules 36 so that a given master metadata table and its corresponding backup metadata table are stored on different modules 36. Likewise, when distributing the backup caches, the given processor can balance the cache table distribution among modules 36 so that a given master cache 40 and its corresponding backup cache are stored on different modules 36. Returning to step 108, if the given processor 62 does not detect any hardware and/or a software failure in modules 36, then the method returns to step 100.

As described in step 92 of the flow diagram shown in FIG. 4, processor 62 may distribute both the second metadata tables corresponding to first metadata tables in each metadata set and the second caches corresponding to first caches in each cache set among multiple modules 36. In the event of a failure (i.e., step 108), this distribution enables storage controller 24 to distribute the reconfiguration tasks (i.e., steps 110-120) among multiple modules 36, thereby "balancing" the reconfiguration.

In some embodiments, processor 62 may ensure that the backup metadata tables and the backup caches which are reconfigured to become master metadata tables and master caches are not concentrated on a few modules 36, which may, as a consequence, become overloaded. Therefore, when addressing the set of all the master metadata tables and the master caches whose master copy resides on any given module 36, it can be enhance resiliency if the backup responsibilities for those metadata tables and caches are distributed in a balanced way among the other modules.

While the configuration described in the flow comprises a single backup for each metadata table and cache 40, other configurations are considered to be within the spirit and scope of the present invention. For example, in the example shown in FIG. 3, processor 62 may maintain two backups for each master metadata table and each cache 40, and distributes the backup metadata tables and the backup caches among modules 36 in order to enable storage controller 34 to recover from a failure of any two of the modules.

Additionally or alternatively, while the example described in the figures implements redundancy and resiliency by storing, in a master scheduler 72 for a given slice 60, a given master metadata table and a given master cache 40, and storing, to a backup scheduler 72 for the given slice, a given backup metadata table and a given backup cache 40, other methods of implementing redundancy and resiliency for a given slice is considered to be within the spirit and scope of the present invention. For example, processor 62 can distribute a first number of backup metadata tables among modules 36, and distribute a second number (different than the first number) of backup caches among the modules.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A method, comprising:
arranging multiple storage devices and multiple digital information devices having respective memories to communicate within a network;
dividing data of a logical volume into data subsets;
defining, for the logical volume, at least one storage configuration for the data subsets distributed among the respective storage devices;
writing metadata for the logical volume to a first set of first metadata tables, each of the first metadata tables configured as a master metadata table;
dividing the first set of first metadata tables into metadata subsets having a one-to-one correspondence with the data subsets;
distributedly storing the metadata subsets among the multiple digital information devices, the storage configuration of the data subsets independent from the storing of the metadata subsets;
copying the metadata from the first set of first metadata tables to a second set of corresponding second metadata tables in a one-to-one correspondence with the first metadata tables, each of the second metadata tables configured as a backup metadata table;
distributedly storing the second metadata tables among the multiple digital information devices so that a given first metadata table and the corresponding second metadata table are stored to a different one of the multiple digital information devices, and so that the corresponding second metadata tables for the first metadata tables on a first of the digital information devices are distributed among at least an additional two of the digital information devices; and
upon modifying the metadata in a one of the first metadata tables while processing a storage request, updating the corresponding second metadata table with the updated metadata.

2. The method according to claim 1, and comprising distributedly storing the second metadata tables so that the corresponding second metadata tables for the first metadata tables on the first of the digital information devices are distributed among at least an additional three of the digital information devices.

3. The method according to claim 1, and comprising upon detecting a failure of a given one of the digital information devices storing one of the first metadata tables, configuring the corresponding second metadata table as a new master metadata table, creating a new second metadata table, and configuring the new second metadata table as a backup metadata table for the new master metadata table.

4. The method according to claim 1, and comprising writing operational data for the logical volume to a first set of first operational data tables having a one-to-one correspondence with the data subsets, each of the first operational data tables configured as a master operational data table, dividing the first set of first operational data tables into operational data subsets, the storage configuration of the data subsets independent from the storing of the operational data subsets, distributedly storing the operational data subsets among the multiple digital information devices, copying the operational data to a second set of corresponding second operational data tables in a one-to-one correspondence with the first operational data tables, each of the second operational data tables configured as a backup operational data table, distributedly storing the first and the second operational data tables among the multiple digital information devices so that a given first operational data table and the corresponding second operational data table are stored to a different one of the multiple digital information devices, and so that the corresponding second operational data tables for the first metadata tables on a first of the digital information devices are distributed among at least an additional two of the digital information devices, and upon modifying the operational data in a one of the first operational data tables while processing a storage request, updating the corresponding operational data table with the updated operational data.

5. The method according to claim 4, and comprising distributedly storing the second operational data tables so that the corresponding second operational data tables for the first operational data tables on the first of the digital information are distributed among at least an additional three of the digital information devices.

6. The method according to claim 4, and comprising upon detecting a failure of a given one of the digital information devices storing one of the first operational data tables, configuring the corresponding second operational data table as a new master cache, creating a new second operational data table, and configuring the new second operational data table as a backup operational data table for the new master operational data table.

7. The method according to claim 1, wherein the digital information device comprises a module of a storage controller, and wherein the storage configuration comprises a redundant array of independent disks (RAID) configuration.

8. The method according to claim 1, wherein the metadata for the logical volume is selected from a list comprising a partition table, a transaction distribution table and a disk distribution table.

9. An apparatus, comprising:
multiple storage devices and multiple digital information devices arranged on a network and having respective memories; and
a separate processor coupled to each of the respective memories and configured to divide data of a logical volume into data subsets, to define, for the logical volume, at least one storage configuration for the data subsets distributed among the respective storage devices, to write metadata for the logical volume to a first set of first metadata tables, each of the first metadata tables configured as a master metadata table, to divide the first set of first metadata tables into metadata subsets having a one-to-one correspondence with the data subsets, to distributedly store the metadata subsets among the multiple digital information devices, the storage configuration of the data subsets independent from the storing of the metadata subsets, to copy the metadata from the first set of first metadata tables to a second set of corresponding second metadata tables in a one-to-one correspondence with the first metadata tables, each of the second metadata tables configured as a backup metadata table, and to distributedly store the second metadata tables among the multiple digital information devices so that a given first metadata table and the corresponding second metadata table are stored to a different one of the multiple digital information devices, and so that the corresponding second metadata tables for the first metadata tables on a first of the digital information devices are distributed among at least an additional two of the digital information devices, and upon modifying the metadata in a one of the first metadata tables while processing a storage request, a given one of the separate processors is configured to update the corresponding second metadata table with the updated metadata.

10. The apparatus according to claim 9, wherein the separate processor is configured to distributedly store the second metadata tables so that the corresponding second metadata tables for the first metadata tables on the first of the digital information devices are distributed among at least an additional three of the digital information devices.

11. The apparatus according to claim 9, wherein upon detecting a failure of a given one of the digital information devices storing one of the first metadata tables, the separate processor is arranged to configure the corresponding second metadata table as a new master metadata table, to create a new second metadata table, and to configure the new second metadata table as a backup metadata table for the new master metadata table.

12. The apparatus according to claim 9, wherein the separate processor is configured to write operational data for the logical volume to a first set of first operational data tables having a one-to-one correspondence with the data subsets, each of the first operational data tables configured as a master operational data table, the storage configuration of the data subsets independent from the storing of the cache subsets, to divide the first set of first operational data tables into operational data subsets, to distributedly store the operational data subsets among the multiple digital information devices, to copy the operational data to a second set of corresponding second operational data tables in a one-to-one correspondence with the first operational data tables, each of the second operational data tables configured as a backup operational data table, to distributedly store the first and the second operational data tables among the multiple digital information devices so that a given first operational data table and the corresponding second operational data table are stored to a different one of the multiple digital information devices, and so that the corresponding second operational data table for the first metadata tables on a first of the digital information devices are distributed among at least an additional two of the digital information devices, and wherein upon modifying the operational data in a one of the first operational data tables while processing a storage request, the separate processor is configured to update the corresponding operational data table with the updated operational data.

13. The apparatus according to claim 12, wherein the separate processor is configured to distributedly store the second operational data tables so that the corresponding second operational data tables for the first operational data tables on the first of the digital information are distributed among at least an additional three of the digital information devices.

14. The apparatus according to claim 12, wherein upon detecting a failure of a given one of the digital information devices storing one of the first operational data tables, the separate processor is arranged to configure the corresponding second operational data table as a new master operational data table, to create a new second operational data table, and to configure the new second operational data tables as a backup operational data table for the new master cache.

15. A computer program product, the computer program product comprising:
a non-transitory computer readable storage medium having computer readable program code embodied therewith, the computer readable program code comprising:
computer readable program code configured to arrange multiple storage devices and multiple digital information devices having respective memories to communicate within a network;
computer readable program code configured to divide data of a logical volume into data subsets;
computer readable program code configured to define, for the logical volume, at least one storage configuration for the data subsets distributed among the respective storage devices;
computer readable program code configured to write metadata for the logical volume to a first set of first metadata tables, each of the first metadata tables configured as a master metadata table;
computer readable program code configured to divide the first set of first metadata tables into metadata subsets having a one-to-one correspondence with the data subsets;
computer readable program code configured to distributedly store the metadata subsets among the multiple digital information devices, the storage configuration of the data subsets independent from the storing of the metadata subsets;
computer readable program code configured to copye the metadata from the first set of first metadata tables to a second set of corresponding second metadata tables in a one-to-one correspondence with the first metadata tables, each of the second metadata tables configured as a backup metadata table;
computer readable program code configured to distributedly store the second metadata tables among the multiple digital information devices so that a given first metadata table and the corresponding second metadata table are stored to a different one of the multiple digital information devices, and so that the corresponding second metadata tables for the first metadata tables on a first of the digital information devices are distributed among at least an additional two of the digital information devices; and
computer readable program code configured to update, upon modifying the metadata in a one of the first metadata tables while processing a storage request, the corresponding second metadata table with the updated metadata.

16. The computer program product according to claim 15, and comprising computer readable program code configured to distributedly store the second metadata tables so that the corresponding second metadata tables for the first metadata tables on the first of the digital information devices are distributed among at least an additional three of the digital information devices.

17. The computer program product according to claim 15, and comprising upon detecting a failure of a given one of the digital information devices storing one of the first metadata tables, computer readable program code configured to configure the corresponding second metadata table as a new master metadata table, to create a new second metadata table, and to configure the new second metadata table as a backup metadata table for the new master metadata table.

18. The computer program product according to claim 15, and comprising computer readable program code configured to write operational data for the logical volume to a first set of first operational data tables having a one-to-one correspondence with the data subsets, each of the first operational data tables configured as a master operational data table, to divide the first set of first operational data tables into operational data subsets, the storage configuration of the data subsets independent from the storing of the operational data subsets, to distributedly store the operational data subsets among the multiple digital information devices, to copy the operational data to a second set of corresponding second operational data tables in a one-to-one correspondence with the first operational data tables, each of the second operational data tables configured as a backup operational data table, to distributedly store the first and the second operational data tables among the multiple digital information devices so that a given first operational data table and the corresponding second operational data table are stored to a different one of the multiple digital information devices, and so that the corresponding second operational data tables for the first metadata tables on a first of the digital information devices are distributed among at least an additional two of the digital information devices, and upon modifying the operational data in a one of the first operational data tables while processing a storage request, computer readable program code configured to update the corresponding operational data table with the updated operational data.

19. The computer program product according to claim 18, and comprising computer readable program code configured to distributedly store the second operational data tables so that the corresponding second operational data tables for the first operational data tables on the first of the digital information are distributed among at least an additional three of the digital information devices.

20. The computer program product according to claim 18, and comprising upon detecting a failure of a given one of the digital information devices storing one of the first operational data tables, computer readable program code configured to configure the corresponding second operational data table as a new master cache, to create a new second operational data table, and to configure the new second operational data table as a backup operational data table for the new master operational data table.

* * * * *